US010661764B1

(12) United States Patent
Katzourakis et al.

(10) Patent No.: US 10,661,764 B1
(45) Date of Patent: May 26, 2020

(54) BRAKING SYSTEM CONTROL STATE TRANSITIONS (71) Applicants: Diomidis Katzourakis, Chania (GR); Huibert Mees, Pleasanton, CA (US); Robert M. Cammarata, Shelby Township, MI (US)

(72) Inventors: Diomidis Katzourakis, Chania (GR); Huibert Mees, Pleasanton, CA (US); Robert M. Cammarata, Shelby Township, MI (US)

(73) Assignee: Apple Inc., Cupertino, CA (US)

( * ) Notice: Subject to any disclaimer, the term of this patent is extended or adjusted under 35 U.S.C. 154(b) by 256 days.

(21) Appl. No.: 15/907,358

(22) Filed: Feb. 28, 2018

Related U.S. Application Data (60) Provisional application No. 62/477,699, filed on Mar. 28, 2017.

(51) Int. Cl.
*B60T 7/16* (2006.01)
*B60T 8/32* (2006.01)
*B60T 8/172* (2006.01)

(52) U.S. Cl.
CPC ............... *B60T 7/16* (2013.01); *B60T 8/172* (2013.01); *B60T 8/32* (2013.01)

(58) Field of Classification Search
CPC .................................................... B60T 7/16
See application file for complete search history.

(56) References Cited

U.S. PATENT DOCUMENTS

| RE33,626 E | * | 7/1991 | Asami ................ B60G 21/0556 280/5.517 |
| 5,640,323 A | | 6/1997 | Kleimenhagen et al. |
| 6,025,695 A | * | 2/2000 | Friel .................... H02J 7/00036 320/106 |
| 6,410,992 B1 | * | 6/2002 | Wall ......................... H02J 3/42 290/52 |
| 7,074,160 B1 | | 7/2006 | Inoue et al. |
| 7,894,951 B2 | | 2/2011 | Norris et al. |
| 7,979,172 B2 | | 7/2011 | Breed |
| 8,606,455 B2 | | 12/2013 | Boehringer et al. |
| 8,706,394 B2 | | 4/2014 | Trepagnier et al. |
| 2002/0130550 A1 | * | 9/2002 | Roden ..................... B60T 7/042 303/113.1 |
| 2005/0256631 A1 | * | 11/2005 | Cawthorne .............. B60K 6/40 701/99 |

(Continued)

FOREIGN PATENT DOCUMENTS

DE 10144797 A1 3/2003
JP 2006137258 A 6/2006

*Primary Examiner* — Alex C Dunn
(74) *Attorney, Agent, or Firm* — Young Basile Hanlon & MacFarlane, P.C.

(57) ABSTRACT

A method for controlling a vehicle includes operating a braking system in robotic control state, determining that an emergency stop state is to be entered by the braking system, entering the emergency stop state upon determining that all conditions from a group of state entry conditions are satisfied, decelerating the vehicle using the braking system while in the emergency stop state, determining, while in the emergency stop state, that all conditions from a group of state exit conditions are satisfied, and exiting the emergency stop state in response to determining that all conditions from the group of state exit conditions are satisfied.

21 Claims, 5 Drawing Sheets

(56) References Cited

U.S. PATENT DOCUMENTS

| | | | |
|---|---|---|---|
| 2006/0195231 A1 | 8/2006 | Diebold et al. | |
| 2006/0229742 A1* | 10/2006 | Boutin | G06F 30/18 |
| | | | 700/32 |
| 2007/0173984 A1* | 7/2007 | Nakayama | B60T 13/74 |
| | | | 701/1 |
| 2008/0086241 A1 | 4/2008 | Phillips et al. | |
| 2009/0079575 A1* | 3/2009 | Bouressa | G07C 9/27 |
| | | | 340/573.4 |
| 2010/0138066 A1* | 6/2010 | Kong | G06Q 30/018 |
| | | | 700/295 |
| 2010/0179715 A1 | 7/2010 | Puddy | |
| 2011/0241862 A1 | 10/2011 | Debouk et al. | |
| 2014/0100750 A1* | 4/2014 | Stares | B60K 17/34 |
| | | | 701/69 |
| 2014/0303827 A1 | 10/2014 | Dolgov et al. | |
| 2016/0078208 A1* | 3/2016 | Namiki | G06F 21/6218 |
| | | | 726/1 |
| 2017/0297547 A1* | 10/2017 | Goto | B60T 7/12 |
| 2019/0054903 A1* | 2/2019 | Blattert | B60T 8/321 |
| 2019/0084533 A1* | 3/2019 | Kasper | B60T 7/12 |

* cited by examiner

BRAKING SYSTEM CONTROL STATE TRANSITIONS

CROSS-REFERENCE TO RELATED APPLICATIONS

This application claims the benefit of U.S. Provisional Application No. 62/477,699, filed on Mar. 28, 2017, entitled "Braking System Control State Transitions," the content of which is incorporated herein by reference in its entirety for all purposes.

TECHNICAL FIELD

The application relates generally to vehicle braking systems.

BACKGROUND

Vehicle actuators are controllable systems that cause or affect motion of a vehicle. Examples of vehicle actuators are propulsion actuators, braking actuators, steering actuators, and suspension actuators.

Some vehicles can be operated in an automated control mode, in which some or all of the tasks of driving are performed by an automated control system, and a manual control mode, in which all of the tasks of driving are performed by a human operator. In addition to these modes, some vehicles can also be operated in a remote control mode, in which some or all of the tasks of driving are controlled by an automated control system or a human driver that is not located in the vehicle.

In vehicles that incorporate automated control modes, vehicle braking systems can be operated by the automated control system in the automated control mode or by the human operator in the manual control mode. During operation of such a vehicle, transitions between the one or more automated control modes and the manual control mode may occur.

SUMMARY

One aspect of the disclosed embodiments is a method for controlling a vehicle. The method includes operating a braking system in a robotic control state, determining that an emergency stop state is to be entered by the braking system, entering the emergency stop state upon determining that all conditions from a group of state entry conditions are satisfied, decelerating the vehicle using the braking system while in the emergency stop state, determining, while in the emergency stop state, that all conditions from a group of state exit conditions are satisfied, and exiting the emergency stop state in response to determining that all conditions from the group of state exit conditions are satisfied.

Another aspect of the disclosed embodiments is a method for controlling a vehicle. The method includes operating a braking system in a first control state; determining, during operation in the first control state, that a state change from the first control state to the second control state should be performed; obtaining information describing a first group of state transition conditions that correspond to transition from the first control state to the second control state; and upon determining, during operation in the first control state, that all conditions from the first group of state transition conditions are satisfied, entering the second control state.

Another aspect of the disclosed embodiments is a braking system for a vehicle. The braking system includes a vehicle control module that has a manual brake control state and a non-manual brake control state, a braking system controller, and braking components that are operable to decelerate the vehicle. The braking system also includes a primary brake control module that is hydraulically connected to the braking components and operable to cause operation of the braking components, and a secondary brake control module that is hydraulically connected to the braking components and operable to cause operation of the braking components. The braking system controller transitions operation from a normal operation mode, in which the braking components are operated by the primary brake control module, to a degraded operation mode, in which the braking components are operated by the secondary control module, in response to determining that the primary brake control module is not available for use. The vehicle control module is operable to request transition between a manual control state and a non-manual control state. The braking system controller is operable to permit transition from the manual control state to the non-manual control state during the normal operation mode, and the braking system controller is operable to prevent transition from the manual control state to the non-manual control state during the degraded operation mode.

DETAILED DESCRIPTION

The description herein is directed to vehicle braking systems that can be operated in manual control modes and robotic control modes, inclusive of automated control modes and remote control modes. State changes of a vehicle braking system between manual and robotic control modes can be initiated by a human operator or by an automated control system. Dependent upon operating states of the vehicle, a particular control mode transition may or may not be appropriate at a particular moment in time.

In the apparatuses, systems and methods described in this document, the braking system has multiple control states that are usable in manual control modes and/or in robotic control modes. The braking system regulates initiation and performance of transitions between control states.

Figure 1:
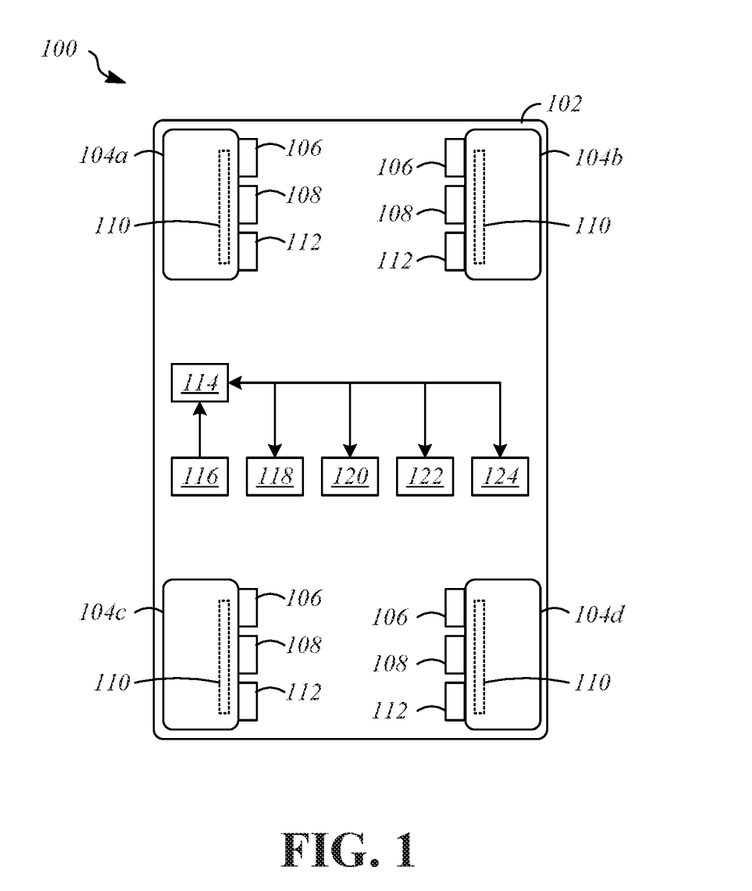
FIG. 1 is an illustration showing a vehicle.

FIG. 1 shows a vehicle 100 that has a vehicle body 102. The vehicle body 102 may include internal structural portions and external portions that are aesthetic and/or structural in nature. As examples, the vehicle body 102 may include one or more of a unibody, a frame, a subframe, a monocoque, and body panels.

The vehicle 100 includes road wheels including a front left wheel 104*a*, a front right wheel 104*b*, a rear left wheel 104*c*, and a rear right wheel 104*d*. Four of the wheels 104*a*-104*d* are included in the illustrated example, but other implementations are possible. The wheels 104*a*-104*d* are the portion of the vehicle 100 that contacts the surface on which the vehicle 100 is travelling, and the characteristics of the wheels 104*a*-104*d* are responsible, in part, for the amount of friction available. The wheels 104*a*-104*d* may include tires, such as conventional pneumatic tires formed in part from synthetic rubber, or other friction-enhancing structures may be incorporated in the wheels 104a-104d.

The vehicle 100 includes suspension components 106. The suspension components 106 typically include numerous individual components, many of which are associated with one or more of the wheels 104a-104d. The suspension components 106 may include components that are operable to control characteristics of the motion of the wheels 104a-104d relative to the vehicle body 102, such as shocks, struts, springs, and sway bars. The suspension components 106 may include either or both of non-adjustable passive components or adjustable active components that allow modification of suspension characteristics during operation of the vehicle 100. The suspension components 106 may include sensors that output signals indicative of the states and operating characteristics of some or all of the suspension components 106 at a given time. The suspension components 106 may also include actuators that are able to cause modification of characteristics of the suspension components 106 in response to control signals. In implementations where the suspension components 106 include active features controlled by actuators, the suspension characteristics can be controlled independently at each of the wheels 104a-104d.

The vehicle 100 includes steering components 108. The steering components 108 are operable to modify a steering angle of some or all of the wheels 104a-104d relative to the vehicle body 102. As one example, the steering components 108 may be or include a conventional rack and pinion arrangement. In some implementations, the steering components 108 are operable to control the steering angles of the wheels 104a-104d independently. The steering components 108 may include one or more sensors to output signals indicative of the steering angles of the wheels 104a-104d. The steering components 108 may include actuators operable to cause adjustment of the steering angles of the wheels 104a-104d in response to control signals. The steering angles of the wheels 104a-104d can be determined based inputs made by a human operator using an input device such as a steering wheel, or the steering angles of the wheels 104a-104d can be determined based on decisions made by an automated control system. The determined angles can include individual steering angles for each of wheels 104a-104d, such as a front left steering angle $\delta_{FL}$ for the front left wheel 104a, a front right steering angle $\delta_{FR}$ for the front right wheel 104b, a rear left steering angle $\delta_{RL}$ for the rear left wheel 104c, and a rear right steering angle $\delta_{RR}$ for the rear right wheel 104d.

The vehicle 100 includes braking components 110. The braking components 110 include components that are operable to slow the speeds of the wheels 104a-104d, such as conventional disk brakes. Other types of components may be utilized to slow the speeds of the wheels 104a-104d. The braking components 110 also include components that cause and control application of braking forces. These components may include, as examples, a brake control module, a master cylinder, and a brake booster. The braking components 110 are operable to apply braking to each of the wheels 104a-104d individually. The braking components 110 include sensors that output signals that are indicative of the current operating characteristics of the braking components 110. The braking components 110 may also include actuators that are operable to cause and control application of braking forces in response to control signals.

The vehicle 100 includes propulsion components 112, which may also be referred to as a powertrain. The propulsion components 112 include a prime mover that is operable to convert stored energy into driving force, and components that are operable to supply this force to some or all of the wheels 104a-104d in order to propel the vehicle 100. As one example, the propulsion components 112 may include an internal combustion engine that burns liquid fuel. As another example, the propulsion components 112 may include an electric motor that utilizes electrical energy that is stored in batteries or supplied by a generator or multiple electric motors that are each connected to one of the wheels 104a-104d. In implementations where the propulsion components 112 include multiple electric motors that are each connected to one of the wheels 104a-104d, each electric motor is directly connected to a respective one of the wheels 104a-104d in a manner that allows torque to be applied directly to each of the wheels 104a-104d independent of torque applied at the other wheels.

The vehicle 100 includes a vehicle control module 114. The vehicle control module 114 is an electronic control unit that is operable to direct and coordinate operations of multiple actuator systems. The vehicle control module 114 may include a memory and a processor that is operable to execute instructions that are stored in the memory in order to perform operations as will be described herein. Although the vehicle control module 114 is shown as a single device, the same functions may be implemented using multiple devices, such as individual electronic control units that each perform a subset of the functions described herein with respect to the vehicle control module 114.

The vehicle control module 114 makes decisions regarding operation of the vehicle 100 based in part on information that is received from sensors 116 that are in communication with the vehicle control module 114. The sensors 116 monitor and report information regarding operating characteristics of the vehicle 100. Some of the sensors 116 may be incorporated in the suspension components 106, the steering components 108, the braking components 110, and the propulsion components 112.

The vehicle control module 114 can incorporate automated control functions that direct operation of the actuator systems when the vehicle 100 is being operated in a robotic control mode. In order to control the individual actuator systems, the vehicle 100 can include a suspension system controller 118, a steering system controller 120, a braking system controller 122, and a propulsion system controller 124. Each of the suspension system controller 118, the steering system controller 120, the braking system controller 122, and the propulsion system controller 124 are electrically connected to the vehicle control module 114, such as by a data communication network that allows transmission and reception of data. One example of a data network that can be incorporated in the vehicle 100 is one that complies with the Controller Area Network standard, which allows connected devices to communicate with other connected devices using a message-based communications protocol.

The suspension system controller 118 is operable to control operation of the suspension components 106. The suspension system controller 118 may include a memory and a processor that is operable to execute instructions that are stored in the memory in order to perform suspension control operations. The suspension system controller 118 may be electrically connected to the suspension components 106 for transmission of signals and/or data, such as commands that change operating characteristics of the suspension components 106. The suspension system controller 118 can include electromechanical components that physically actuate the suspension components 106 and/or change operating characteristics of the suspension components 106.

The steering system controller 120 is operable to control operation of the steering components 108. The steering system controller 120 may include a memory and a processor that is operable to execute instructions that are stored in the memory in order to perform steering control operations. The steering system controller 120 may be electrically connected to the steering components 108 for transmission of signals and/or data, such as commands that change operating characteristics of the steering components 108. The steering system controller 120 can include electromechanical components that physically actuate the steering components 108 and/or change operating characteristics of the steering components 108.

The braking system controller 122 is operable to control operation of the braking components 110. The braking system controller 122 may include a memory and a processor that is operable to execute instructions that are stored in the memory in order to perform braking control operations. The braking system controller 122 may be electrically connected to the braking components 110 for transmission of signals and/or data, such as commands that change operating characteristics of the braking components 110. The braking system controller 122 can include electromechanical components that physically actuate the braking components 110 and/or change operating characteristics of the braking components 110.

The braking system controller 122 can receive and utilize multiple types of information for determining how to control the braking components 110. The information used by the braking system controller 122 can include sensor output signals from sensors included in the braking components 110, information received from the vehicle control module 114 and/or other systems of the vehicle 100, wheel speed information, state information for a master cylinder included in the braking components 110 such as master cylinder travel and master cylinder pressure, yaw rate, lateral acceleration, longitudinal acceleration, longitudinal and lateral speed, body slip angle, road wheel angles, normal load estimates for the road wheels, and desired deceleration and/or brake pressure profiles.

The propulsion system controller 124 is operable to control operation of the propulsion components 112. The propulsion system controller 124 may include a memory and a processor that is operable to execute instructions that are stored in the memory in order to perform propulsion control operations. The propulsion system controller 124 may be electrically connected to the propulsion components 112 for transmission of signals and/or data, such as commands that change operating characteristics of the propulsion components 112. The propulsion system controller 124 can include electromechanical components that physically actuate the propulsion components 112 and/or change operating characteristics of the propulsion components 112.

Figure 2:
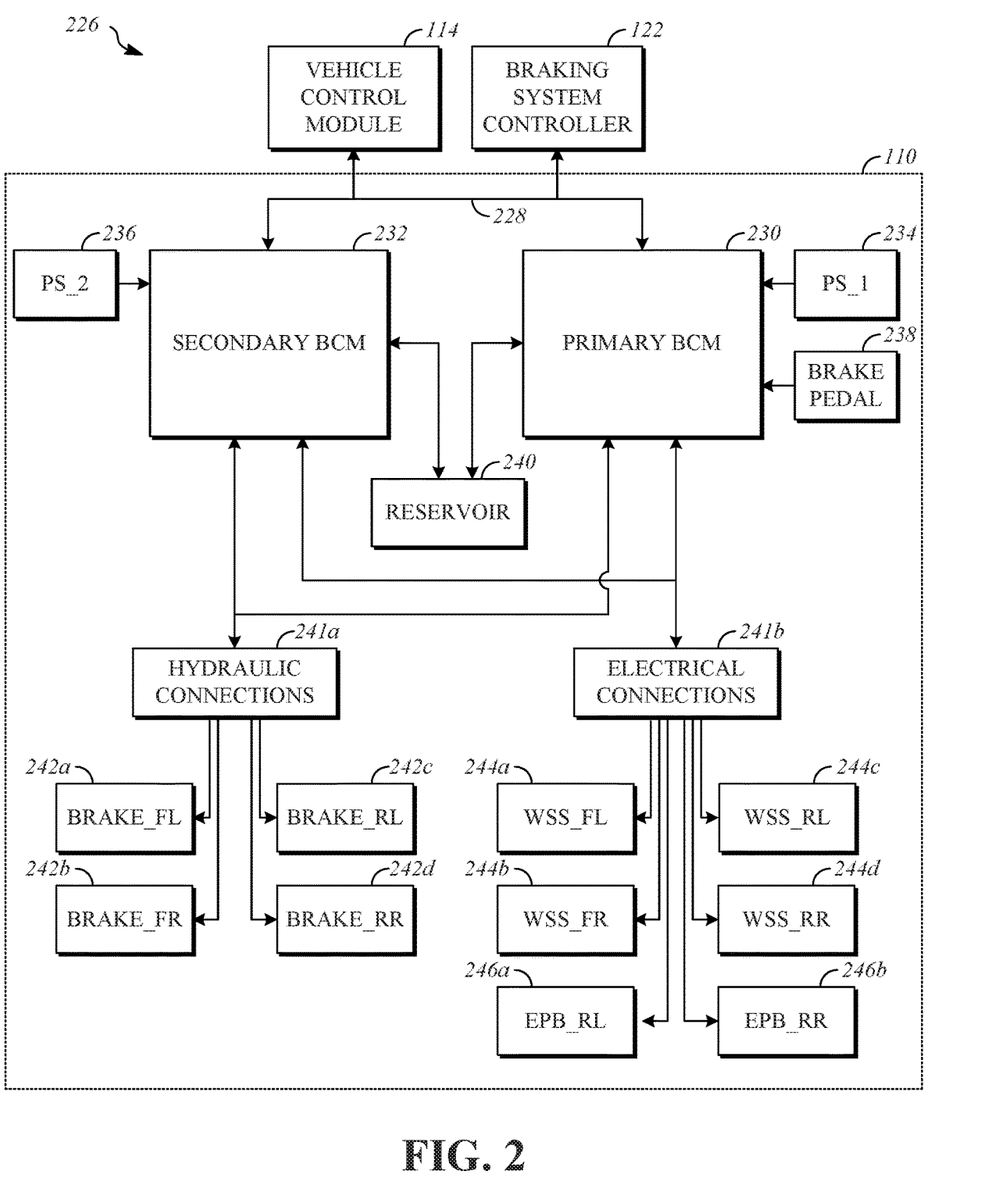
FIG. 2 is an illustration showing a braking system.

FIG. 2 is an illustration showing a braking system 226 that includes the vehicle control module 114, the braking system controller 122, and the braking components 110. The braking system 226 causes and controls deceleration of the vehicle 100. As an example, deceleration of the vehicle 100 may be performed in accordance with control inputs made by a human driver, by a deceleration profile determined by the vehicle control module 114 that is determined based on operating characteristics of the vehicle 100 and/or inputs from the sensors 116 during operation in a robotic control mode, or by a predetermined deceleration profile. As an example, a predetermined deceleration profile may be stored by the vehicle control module 114 and/or by the braking system controller for use under specified conditions, as will be described in detail herein. A deceleration request may also be specified as a brake pressure based on boost level, or based on wheel slip together with individual wheel pressure.

The vehicle control module 114, the braking system controller 122, and some of the braking components 110 are electrically connected to allow for transmission of signals and data, such as by a data communication network 228. As an example, the data communication network 228 may comply with the Controller Area Network standard, or may utilize a different protocol or standard that facilitates communications between connected electrical components. Using the data communication network 228, the vehicle control module 114 can communicate with the braking system controller 122 and/or the braking components 110. The braking components 110 that are connected to the data communication network 228 can communicate with each other, with the vehicle control module 114, and/or with the braking system controller 122.

The braking components 110 include a primary brake control module 230 (primary BCM) and a secondary brake control module 232 (secondary BCM). The primary brake control module 230 and the secondary brake control module 232 are electromechanical components that each are operable to perform control operations in response to signals and/or data that is received from the data communication network 228. The primary brake control module 230 and the secondary brake control module 232 are connected to the data communication network 228 in a manner that is electrically parallel relative to the vehicle control module 114 and the braking system controller 122. This parallel configuration allows independent operation of the primary brake control module 230 and the secondary brake control module 232, in order to allow continued operation of the braking system 226 in the event of failure of one of the primary brake control module 230 and the secondary brake control module 232. The primary brake control module 230 and the secondary brake control module 232 are also connected to one another, such as by the data communication network 228, such that each is able to send information to and receive information from the other.

The primary brake control module 230 and the secondary brake control module 232 are similar components that are each configured to exercise control over other included components from the braking components 110, in order to cause and regulate deceleration of the vehicle 100. The primary brake control module 230 and the secondary brake control module 232 each include electrical control components such as a processor and a memory that stores instructions that can be executed by the processor. The electrical control components that are incorporated in each of the primary brake control module 230 and the secondary brake control module 232 each cause and regulate operation of braking actuators. The braking actuators can be hydraulic actuators that are included in the primary brake control module 230 and the secondary brake control module 232. Other types of braking actuators can be used, such as electro-mechanical braking actuators. To pressurize a working fluid (e.g., brake fluid) in hydraulically actuated braking systems, the primary brake control module 230 and the secondary brake control module 232 can each include a brake booster, such as a linear actuator or a hydraulic pump.

The primary brake control module 230 and the secondary brake control module 232 are operable to receive braking commands from the vehicle control module 114 and/or the braking system controller 122. The braking commands are interpreted by the primary brake control module 230 and/or the secondary brake control module 232 and are used to control operation of other included components from the braking components 110. The braking command may be, for example, in the form of a request for a specific action. As an example, a request for braking may specify a desired braking force, a desired deceleration rate, or a desired fluid pressure to be supplied to the brakes.

The braking components 110 include a first power supply 234 (PS_1) and a second power supply 236 (PS_2). The first power supply 234 provides low voltage power to the primary brake control module 230. The second power supply 236 provides low voltage power to the secondary brake control module 232. The first power supply 234 and the second power supply 236 can be connections to independent power sources or can be separate connections to a common power source.

The primary brake control module 230 is connected, such as physically by a mechanical connection or a hydraulic connection, and/or electrically, such as a communication network or analog signal, to a brake pedal 238. The brake pedal 238 is a conventional vehicle control pedal that may be used by a human operator to provide inputs to the braking system 226 to control the amount of braking applied by the braking system 226.

The braking components 110 may include a fluid reservoir 240 in hydraulically actuated braking systems. The fluid reservoir 240 is hydraulically connected to the to the primary brake control module 230 and the secondary brake control module 232, such as by fluid lines. The fluid reservoir 240 holds excess quantities of the working fluid that is utilized by the hydraulic actuators that are included in the primary brake control module 230 and the secondary brake control module 232. The working fluid is removed from and returned to the fluid reservoir 240 by the primary brake control module 230 and the secondary brake control module 232 during operation of the braking system 226.

The braking components 110 include components that are associated with the front left wheel 104a, the front right wheel 104b, the rear left wheel 104c, and the rear right wheel 104d, including hydraulic components, such as hydraulic braking actuators, and electrical components, such as electrical braking actuators and sensors. These components are connected to the primary brake control module 230 and the secondary brake control module 232. Various architectures can be utilized to connect each of the primary brake control module 230 and the secondary brake control module 232 to some or all of these components. In the illustrated example, these architectures are represented by hydraulic connections 241a and electrical connections 241b, which can represent direct, indirect, single, and/or redundant connections of the primary brake control module 230 and the secondary brake control module 232 to the included components.

The braking components 110 include components that are associated with the front left wheel 104a of the vehicle 100. In the illustrated example, the braking components 110 include a front left brake 242a (BRAKE_FL) and a front left wheel speed sensor 244a (WSS_FL) that are associated with the front left wheel 104a of the vehicle 100.

The front left brake 242a includes components that are physically connected to the vehicle body 102 and to the front left wheel 104a to apply braking to the front left wheel 104a independent of braking applied to any other wheel of the vehicle 100. As an example, the components of the front left brake 242a can include hydraulic pistons that cause engagement of friction pads with a rotor that is connected to the front left wheel 104a such that it rotates in unison with the front left wheel 104a. The front left brake 242a can be a hydraulically actuated brake that is connected to one or both of the primary brake control module 230 and the secondary brake control module 232 by one or more hydraulic fluid lines through the hydraulic connections 241a.

The front left wheel speed sensor 244a is operable to output a signal that is related to the rotational speed of the front left wheel 104a. The signal can be provided to the primary brake control module 230 and the secondary brake control module 232 through the electrical connections 241b. The front left wheel speed sensor 244a can include components that are physically connected to the vehicle body 102 and/or to the front left wheel 104a or components that rotate in unison with or in correspondence to the front left wheel 104a. As one example, the front left wheel speed sensor 244a can include a magnetic sensor or a hall effect sensor that are each able to output a signal representing a rotating feature such as a tone wheel.

The braking components 110 include components that are associated with the front right wheel 104b of the vehicle 100. In the illustrated example, the braking components 110 include a front right brake 242b (BRAKE_FR) and a front right wheel speed sensor 244b (WSS_FR) that are associated with the front right wheel 104b of the vehicle 100.

The front right brake 242b includes components that are physically connected to the vehicle body 102 and to the front right wheel 104b to apply braking to the front right wheel 104b independent of braking applied to any other wheel of the vehicle 100. As an example, the components of the front right brake 242b can include hydraulic pistons that cause engagement of friction pads with a rotor that is connected to the front right wheel 104b such that it rotates in unison with the front right wheel 104b. The front right brake 242b can be a hydraulically actuated brake that is connected to one or both of the primary brake control module 230 and the secondary brake control module 232 by one or more hydraulic fluid lines through the hydraulic connections 241a.

The front right wheel speed sensor 244b is operable to output a signal that is related to the rotational speed of the front right wheel 104b. The signal can be provided to the primary brake control module 230 and the secondary brake control module 232 through the electrical connections 241b. The front right wheel speed sensor 244b can include components that are physically connected to the vehicle body 102 and/or to the front right wheel 104b or components that rotate in unison with or in correspondence to the front right wheel 104b. As one example, the front right wheel speed sensor 244b can include a magnetic sensor or a hall effect sensor that are each able to output a signal representing a rotating feature such as a tone wheel.

The braking components 110 include components that are associated with the rear left wheel 104c of the vehicle 100. In the illustrated example, the braking components 110 include a rear left brake 242c (BRAKE_RL) and a rear left wheel speed sensor 244c (WSS_RL) that are associated with the rear left wheel 104c of the vehicle 100.

The rear left brake 242c includes components that are physically connected to the vehicle body 102 and to the rear left wheel 104c to apply braking to the rear left wheel 104c independent of braking applied to any other wheel of the vehicle 100. As an example, the components of the rear left brake 242c can include hydraulic pistons that cause engagement of friction pads with a rotor that is connected to the rear left wheel 104c such that it rotates in unison with the rear left wheel 104c. The rear left brake 242c can be a hydraulically actuated brake that is connected to one or both of the primary brake control module 230 and the secondary brake control module 232 by one or more hydraulic fluid lines through the hydraulic connections 241a. In the illustrated example, the rear left brake 242c is directly connected to the primary brake control module 230 to allow control of the rear left brake 242c by the primary brake control module 230.

The rear left wheel speed sensor 244c is operable to output a signal that is related to the rotational speed of the rear left wheel 104c. The signal can be provided to the primary brake control module 230 and the secondary brake control module 232 through the electrical connections 241b. The rear left wheel speed sensor 244c can include components that are physically connected to the vehicle body 102 and/or to the rear left wheel 104c or components that rotate in unison with or in correspondence to the rear left wheel 104c. As one example, the rear left wheel speed sensor 244c can include a magnetic sensor or a hall effect sensor that are each able to output a signal representing a rotating feature such as a tone wheel.

The braking components 110 include components that are associated with the rear right wheel 104d of the vehicle 100. In the illustrated example, the braking components 110 include a rear right brake 242d (BRAKE_RR) and a rear right wheel speed sensor 244d (WSS_RR) that are associated with the rear right wheel 104d of the vehicle 100.

The rear right brake 242d includes components that are physically connected to the vehicle body 102 and to the rear right wheel 104d to apply braking to the rear right wheel 104d independent of braking applied to any other wheel of the vehicle 100. As an example, the components of the rear right brake 242d can include hydraulic pistons that cause engagement of friction pads with a rotor that is connected to the rear right wheel 104d such that it rotates in unison with the rear right wheel 104d. The rear right brake 242d can be a hydraulically actuated brake that is connected to one or both of the primary brake control module 230 and the secondary brake control module 232 by one or more hydraulic fluid lines through the hydraulic connections 241a. In the illustrated example, the rear right brake 242d is directly connected to the primary brake control module 230 to allow control of the rear right brake 242d by the primary brake control module 230.

The rear right wheel speed sensor 244d is operable to output a signal that is related to the rotational speed of the rear right wheel 104d. The signal can be provided to the primary brake control module 230 and the secondary brake control module 232 through the electrical connections 241b. The rear right wheel speed sensor 244d can include components that are physically connected to the vehicle body 102 and/or to the rear right wheel 104d or components that rotate in unison with or in correspondence to the rear right wheel 104d. As one example, the rear right wheel speed sensor 244d can include a magnetic sensor or a hall effect sensor that are each able to output a signal representing a rotating feature such as a tone wheel.

The braking components 110 include one or more parking brakes that resist motion of the vehicle 100, either when the vehicle 100 is not operating or in operation and requested to remain at a standstill, such as a rear left electronic parking brake 246a and a rear right electronic parking brake 246b. The rear left electronic parking brake 246a and a rear right electronic parking brake 246b can be electromechanical devices that restrain motion of the rear left wheel 104c and the rear right wheel 104d of the vehicle 100 by mechanically interconnecting rotating and non-rotating components, such as by engagement of structures that are rigidly connected to the vehicle body 102 with the rear left wheel 104c and the rear right wheel 104d. The rear left electronic parking brake 246a and the rear right electronic parking brake 246b can be electronically connected to each of the primary brake control module 230 and the secondary brake control module 232 through the electrical connections 241b to allow redundant actuation. Thus, rear left electronic parking brake 246a and the rear right electronic parking brake 246b can be engaged and disengaged by signals received from either or both of the primary brake control module 230 and the secondary brake control module 232.

The vehicle control module 114 allows operation of the vehicle 100 in two primary control modes, a manual control mode and an automated control mode. In the manual control mode, the braking system 226 can operate in the same manner as a conventional operator-controlled braking system, and also operates according to vehicle states that serve as inputs to, for example, the primary brake control module 230 and the secondary brake control module 232, as will be described herein. In the automated control mode, the braking system 226 is able to operate in response to inputs from a human operator as in the manual control mode, and is also able to cause braking according to external requests from the vehicle control module 114.

In the automated control mode, the external requests from the vehicle control module 114 can be made at multiple control levels including a body control level, a wheel torque control level, a brake booster control level, and a wheel slip control level. External requests that are made at the body control level can be, for example, deceleration profiles. External requests that are made at the wheel torque level can be, for example, individual wheel braking pressures. External requests that are made at the brake booster level can specify a pressure to be generated at the brake booster of the primary brake control module 230 or the secondary brake control module 232. External requests that are made at the wheel slip level can specify an amount of wheel slip to be achieved by the braking system 226 for each of the wheels 104a-104d. The amount of wheel slip can be specified, for example, from an external reference frame.

The vehicle control module 114 is operable to output information to the braking system controller 122 that allows the braking system controller 122 to determine how to control the brake components 110. This allows the braking system controller 122 to receive information from the brake components 110, including the primary brake control module 230 and the secondary brake control module 232, in real-time, which allows the braking system controller 122 to verify that the requests made by the vehicle control module 114 are appropriate, so that operation of the brake components 110 can be modified quickly if needed. Based on information received from the vehicle control module 114, the braking system controller 122 transmits requests to the primary braking control module 230 and the secondary braking control module 232.

The braking system controller 122 can receive information from the vehicle control module 114 that describes a vehicle target state for the vehicle 100. The vehicle target states can include, as examples, states that correspond to the vehicle 100 being turned off, operation of the vehicle 100 under manual control, and/or operation of the vehicle 100 under automated control using a local automated control system, commands from a remote automated control system, or commands from a remote operator using a remote manual control system.

The braking system controller 122 sets a braking system state based on the vehicle target state, and can send information to the primary brake control module 230 and the secondary brake control module 232 describing the braking system state. This information can be transmitted using the data communication network 228. The braking system states can be described by variables, such as a bit flag having a value of one or zero. As an example, a braking system state variable having a value of zero indicates that the state is not active, while a value of one indicates that the state is active.

Transition between braking system states is regulated by state transition variables. For each permissible state transition, a set of state transition variables is defined. The state transition variables can include a variable that indicates a desired state for the braking system 226. The state transition variables can also include one or more state transition variables that specify conditions that must be satisfied for the state transition to occur. State transition variables can be expressed as bit flag values to express whether a condition is true or to identify one of two possible states. State transition variables can also be values that express a measurement or other information, such as a distance, a speed, or a pressure.

Figure 3:
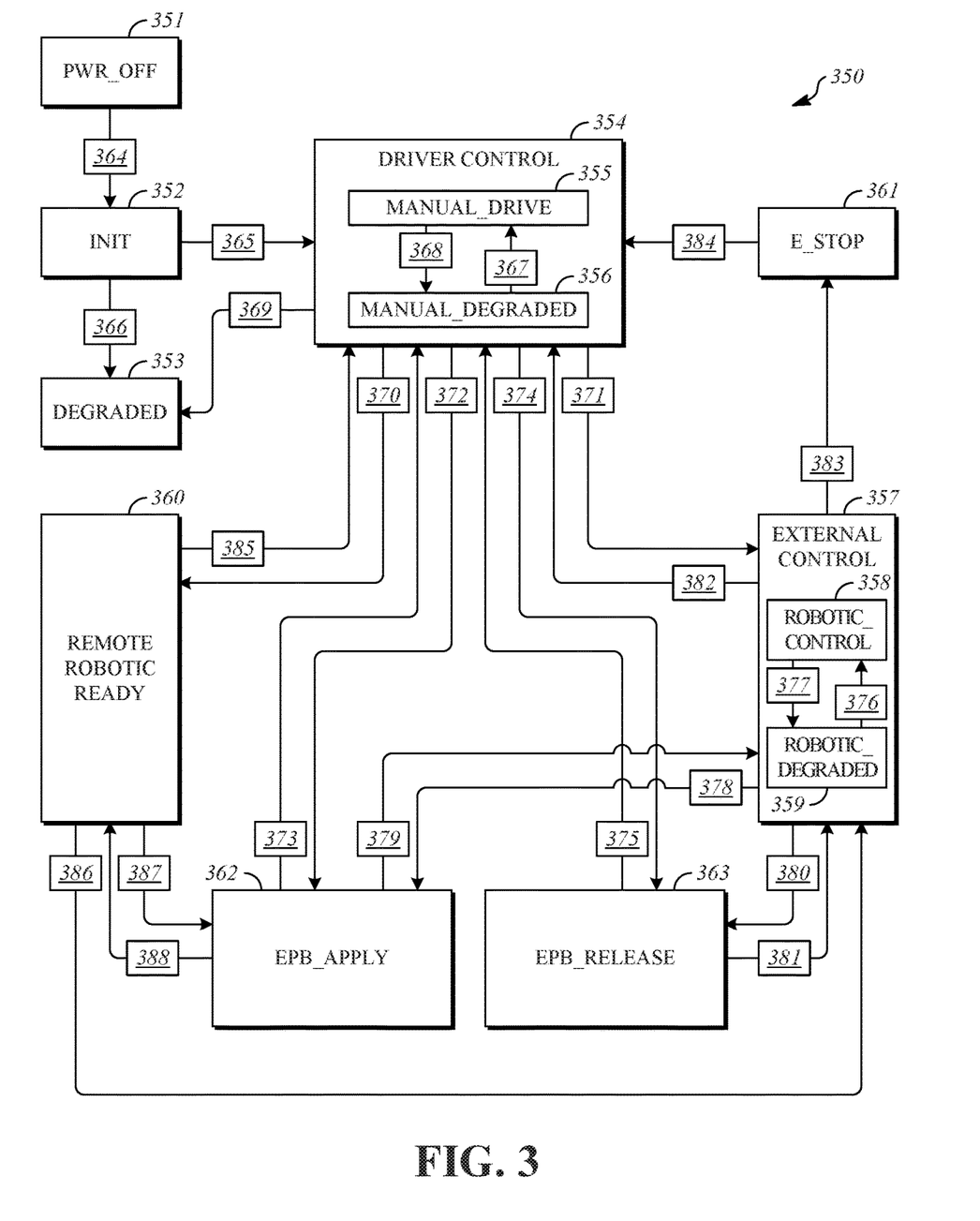
FIG. 3 is a state transition diagram for the braking system.

FIG. 3 is a state transition diagram 350 for the braking system 226 including braking system states and transitions between braking system states.

The braking system states include a power off state 351 (PWR_OFF) having an associated variable that indicates whether the power off state 351 is active. When the power off state 351 is not active, the low voltage power source is supplying power to the primary brake control module 230 and the secondary brake control module 232. When the power off state 351 is active, the low voltage power source is not supplying power to the primary brake control module 230 and the secondary brake control module 232.

The braking system states include an initialization state 352 (INIT) having an associated variable that indicates whether the initialization state 352 is active. When the initialization state 352 is active, the braking system 226 can perform initialization tasks. As one example, the initialization tasks can include executing start up routines. As another example, the initialization tasks can include executing diagnostic routines. As another example, the initialization tasks can include determining values for state transition variables.

The braking system states include a degraded state 353 (DEGRADED) having an associated variable that indicates whether the degraded state 353 is active. As one example, the degraded state 353 can correspond to operation using the secondary brake control module 232 when the primary brake control module 230 is unavailable.

The braking system states include a driver control state 354 (DRIVER_CONTROL) that can be represented by a variable that indicates whether the driver control state 354 is active. The driver control state 354 indicates whether the braking system 226 is being operated manually by a human driver. When the driver control state 354 is not active the braking system 226 is not under the control of a human driver. When the driver control state 354 is active, the braking system 226 is being operated by a human driver, for example, in response to inputs from the brake pedal 238.

The driver control state 354 of the braking system 226 has a manual drive substate 355 (MANUAL_DRIVE) and a manual degraded substate 356 (MANUAL_DEGRADED). Transitions between the manual drive substate 355 and the manual degraded substate 356 are dependent upon the operations of the primary brake control module 230 and the secondary brake control module 232.

The manual drive substate 355 may be represented by a variable that indicates whether the manual drive substate 355 is active. The manual drive substate 355 is active when the primary brake control module 230 is active, and the manual drive substate 355 is not active when the primary brake control module 230 is not active, such as when the primary brake control module 230 has experienced a failure.

In the manual drive substate 355, the primary brake control module 230 is active and the brake booster is operating. The manual drive substate 355 is the default substate of the driver control state 354, and will be used for operation of the braking system 226 unless a state change to the manual degraded substate 356 is triggered, such as by a failure of the primary brake control module 230.

In the manual drive substate 355, the braking system 226 is operable to receive pedal-actuated brake requests from the human operator using the brake pedal 238 and apply braking in response using the primary brake control module. Antilock braking system functions and electronic brake force distribution functions can be applied by the braking system 226.

The manual degraded substate 356 may be represented by a variable that indicates whether the manual degraded substate 356 is active. The manual degraded substate 356 is active when the secondary brake control module 232 is active, such as when the primary brake control module 230 has experienced a failure and is not active, and the manual degraded substate 356 is not active when the primary brake control module 230 is active and the secondary brake control module 232 is active.

In the manual degraded substate 356, the secondary brake control module 232 is active and the brake booster is operating. The manual degraded substate 356 is a non-default substate of the driver control state 354, and will be used for operation of the braking system 226 after a state change from the manual drive substate 355 is triggered, such as by a failure of the primary brake control module 230. The braking system 226 is operable to receive pedal-actuated brake requests and apply braking in response using the secondary brake control module 232 in the manual degraded substate 356. Antilock braking system functions and electronic brake force distribution functions can be applied by the braking system 226.

Transitions to non-manual control modes can be prohibited while in the manual degraded substate 356. Thus, to transition to any non-manual control state, the braking system 226 must first transition from the manual degraded substate 356 to the manual drive substate 355.

The braking system states include an external control state 357 (EXTERNAL_CONTROL) that may be represented by a variable to indicate whether the external control state 357 is active. The external control state 357 is used when the braking system 226 is operated by external commands that are generated in automated control modes, such as commands received from the vehicle control module 114. Commands utilized to control the braking system 226 in the external control state 357 can originate locally, such as from automated control software executed by the vehicle control module 114 or another system, or can originate remotely from a location outside the vehicle 100 such as commands that are issued by a remote automated control system or a remote manual control system. In the external control state 357, external commands can be accepted by the primary brake control module 230 and the secondary brake control module 232 from the vehicle control module 114 or from the braking system controller 122.

The external control state 357 has a robotic control substate 358 (ROBOTIC_CONTROL), and a robotic degraded control substate 359 (ROBOTIC_DEGRADED) having associated variables that indicate whether the respective substates are active. The robotic control substate 358 is utilized when the primary brake control module 230 is functioning normally and the robotic degraded control substate 359 is utilized when the primary brake control module 230 is not functioning normally and braking responsibility has been transitioned to the secondary brake control module 232. Transition between the robotic control substate 358 and the robotic degraded control substate 359 can be controlled using state transition variables that indicate whether each of the primary brake control module 230 and the secondary brake control module 232 are ready for use and state transition variables that indicate whether each of the primary brake control module 230 and the secondary brake control module 232 are currently in operation.

A remote robotic ready state 360 (REMOTE_ROBOTIC_READY) is included in the braking system states and may be represented by an associated variable to indicate whether the remote robotic ready state 360 is active. The remote robotic ready state 360 is used to transition from manual control to remote robotic control of the braking system 226. In the remote robotic ready state 360, the parking brakes can be engaged, such as the rear left electronic parking brake 246a and the rear right electronic parking brake 246b, and the primary brake control module 230 and/or the secondary brake control module 232 can accept commands to prepare for operation, such as a command to operate include brake boosters to provide a desired operating pressure for the working fluid.

Some braking system states may be intended for use during emergency maneuvers. As one example, the braking system states include an emergency stop state 361 (E_STOP) in which the primary brake control module 230 and/or the secondary brake control module 232 applies braking according to a predefined emergency braking maneuver that is stored by the primary brake control module 230 and/or the secondary brake control module 232. The emergency braking maneuver is configured to bring the vehicle 100 to a stop when the emergency stop state 361 is activated.

The emergency stop state 361 can be activated by a request from the vehicle control module 114 that is received at the braking system controller 122 via the data communication network 228. As an example, the vehicle control module 114 can request an emergency stop in response to, for example, determining that operating parameters for the vehicle 100 are outside of acceptable ranges or, as another example, upon request from another control system of the vehicle in response a failure or unacceptable operating state for a different actuator system of the vehicle 100, such as when operating parameters for the primary brake control module 230 and/or the secondary brake control module 232 are outside of acceptable ranges. The braking system controller 122 causes operation of the primary brake control module 230 and/or the secondary brake control module 232 to execute the emergency stop maneuver, and verifies successful completion of the emergency stop maneuver based on sensor information such as wheel speed information. For example, successful completion of the emergency stop maneuver can be verified by the braking system controller 122 determining that wheel speeds are at or below a target value, such as zero (i.e., the vehicle 100 is at a complete stop).

The emergency stop state 361 can also be entered directly by the primary brake control module 230 or the secondary brake control module 232. The primary brake control module 230 can determine that the emergency stop state 361 should be entered if communications with the braking system controller 122 via the data communication network 228 are disrupted for more than a predetermined time period, and in response, the primary brake control module 230 can enter the emergency stop state 361 and execute the emergency stop maneuver according to a predefined deceleration profile or a predefined braking pressure using program instructions and information stored at the primary brake control module 230. The secondary brake control module 232 can determine that the emergency stop state 361 should be entered if communications with the braking system controller 122 and the primary brake control module 230 via the data communication network 228 are disrupted for more than a predetermined time period, and in response, the secondary brake control module 232 can enter the emergency stop state 361 and execute the emergency stop maneuver according to a predefined deceleration profile or a predefined braking pressure using program instructions and information stored at the secondary brake control module 232.

The braking system states include an electric park brake apply state 362 (EPB_APPLY) that can be represented by a variable that indicates whether the electric park brake apply state 362 is active. The electric park brake apply state 362 is active when application of the parking brakes, such as the rear left electronic parking brake 246a and the rear right electronic parking brake 246b, has been requested and is being attempted. State transition variables can include variables indicating that application of the parking brakes is in progress, that the parking brakes have been applied, and that application of the parking brakes has failed.

The braking system states include an electric park brake release state 363 (EPB_RELEASE) that can be represented by a variable that indicates whether the electric park brake release state 363 is active. The electric park brake release state 363 is active when release of the parking brakes, such as the rear left electronic parking brake 246a and the rear right electronic parking brake 246b, has been requested and is being attempted. State transition variables can include variables indicating that release of the parking brakes is in progress, that the parking brakes have been released, and that release of the parking brakes has failed.

In addition to the previously described states, multiple braking system states are available for use when the vehicle 100 is not in motion. The braking system states include a safety off state (SAFETY_OFF) in which the low voltage power from the first power supply 234 and the second power supply 236 is turned off. The braking system states also include a system off state (SYSTEM_OFF) in which the braking system 226 is not operating and is placed into a standby mode until receiving an instruction to resume operation. The braking system states also include a parking/accessory mode (PARK_ACCY) in which parking brakes, such as the rear left electronic parking brake 246a and the rear right electronic parking brake 246b, are engaged. The braking system states also include a charging mode (CHARGING) in which a battery pack of the vehicle is being charged from an external electrical connection, such as at a charging station, and parking brakes, such as the rear left electronic parking brake 246a and the rear right electronic parking brake 246b, are engaged to prevent motion of the vehicle 100 during the charging operation. The braking system states can also include an emergency power off state (EPO) in which the power supply to the primary brake control module 230 and the secondary brake control module 232 from the first power supply 234 and the second power supply 236 is turned off.

Multiple state transitions can be performed by the braking system 226 between the system states described herein and/or additional system states. Whether a particular state transition should be performed can be determined as a function of the current state of the braking system 226 and sets of state transition criteria, typically including requisite values for state transition variables, for each of the possible transitions. The state transition variables used to determine whether the state transition is appropriate may include variables indicating that the brake booster is in a ready state, that the master cylinder pressure is below a threshold value, that the brake pedal travel distance (relative to a neutral position) is less than a threshold value, that brake booster control is active and accepting external booster commands, that the brake booster is operating at a minimum pressure required to hold the vehicle in a stopped condition, and that the vehicle speed is at or below a target speed, such as zero, which can be measured by the wheel speed sensors or other sensors. State transition variable checks can, for example, prevent transition into a mode that requires use of a component when that component is not operational or is not currently able to accept external commands.

The braking system 226 can perform a state transition 364 from the power off state 351 to the initialization state 352 in response to supply of electrical power to the braking system 226. Once other initialization tasks are completed in the initialization state 352, the braking system 226 inspects state transition variables that indicate whether the primary brake control module 230 and the secondary brake control module 232 are operational. If either of the primary brake control module 230 or the secondary brake control module 232 are operational (PRIMARY_READY==1 OR SECONDARY_READY==1), a state transition 365 to the driver control state 354 is performed. If neither of the primary brake control module 230 or the secondary brake control module 232 are operational (PRIMARY_READY==0 AND SECONDARY_READY==0), a state transition 366 to the degraded state 353 is performed.

In the driver control state 354, the braking system 226 inspects the PRIMARY_READY state transition variable and the SECONDARY_READY state transition variable. If the primary brake control module 230 is available (PRIMARY_READY==1), the manual drive substate 355 is entered from a substate transition 367. If the primary brake control module 230 is not available and the secondary brake control module 232 is available (PRIMARY_READY==0 AND SECONDARY_READY==1), the manual degraded substate 356 is entered from a substate transition 368. If, during an inspection of the state transition variables, it is determined that neither of the primary brake control module or the secondary brake control module 232 are available (PRIMARY_READY==0 AND SECONDARY_READY==0), a state transition 369 from the driver control state 354 to the degraded state 353 is performed.

In the driver control state 354, a state transition 370 to the remote robotic ready state 360 can be performed. The braking system controller 122 attempts to execute the state transition 370 when REMOTE_ROBOTIC_READY is set as the target state for the braking system 226. The braking system controller 122 determines whether to execute the state transition based on a group of state transition criteria. In this example, the braking system controller 122 inspects state transition variables to confirm that the brake booster is operational (BOOSTER_READY==1), that the master cylinder pressure is greater than or equal to a threshold (Master_Cylinder_Pressure>=MASTER_CYLINDER_PRESSURE_THR), that the brake pedal travel is less than or equal to a threshold (Brake_Pedal_Travel<=BRAKE_PEDAL_TRAVEL_THR), that the brake booster is able to accept external commands (BOOSTER_CONTROL==1), that the brake booster pressure is adequate to hold the vehicle 100 at a stop (Booster_Pressure>=BOOSTER_PRESSURE_HOLD), and that the vehicle speed is less than a threshold value required to enter the remote robotic ready state 360 (Vehicle_Speed<=VEHICLE_SPEED_RMT_THR). If all of the requisite conditions are satisfied, the braking system controller executes the state transition 370, exits the driver control state 354, and enters the remote robotic ready state 360.

In the driver control state 354, a state transition 371 to the external control state 357 can be performed. The braking system controller 122 attempts to execute the state transition 371 when ROBOTIC_CONTROL is set as the target state for the braking system 226. The braking system controller 122 determines whether to execute the state transition based on a group of state transition criteria. In this example, the braking system controller 122 inspects state transition variables to confirm that the primary brake control module 230 and the secondary brake control module 232 are available to accept external commands (ROBOTIC_READY==1), that the brake booster is operational (BOOSTER_READY==1), that the master cylinder pressure is less than or equal to a threshold (Master_Cylinder_Pressure<=MASTER_CYLINDER_PRESSURE_THR), that the brake pedal travel is less than or equal to a threshold (Brake_Pedal_Travel<=BRAKE_PEDAL_TRAVEL_THR). If all of the requisite conditions are satisfied, the braking system controller 122 executes the state transition 371, exits the driver control state 354, and enters the external control state 357.

In the driver control state 354, a state transition 372 to the electric park brake apply state 362 can be performed. The braking system controller 122 attempts to execute the state transition 372 when the electronic parking brake is not currently applied (EPB_APPLIED==0) and one or more requests or states are active. The state transition 372 can be executed in response to determining that the target state for the braking system 226 is a state in which the vehicle 100 is stopped, such as a system off state (SYSTEM_OFF), a charging state (CHARGING), or a parked state (PARK_ACCY). The state transition 372 can also be executed in response to determining that application of the parking brake has been requested (EPB_APPLY_REQUESTED==1), or in response to determining that an emergency stop has recently been completed (E_STOP_COMPLETED==1). In response to any of these conditions while the electronic parking brake is not currently applied, the braking system controller 122 executes the state transition 372. In the electric park brake apply state 362, the braking system controller 122 determines whether application of the electric park brake was successful and sets an appropriate state transition variable value corresponding to successful application of the electric park brake (EPB_APPLIED==1) or failure to apply the electric park brake (EPB_FAILED==1). In response to determining that the state transition variable has been set, the braking system controller 122 returns to the driver control state 354 from the electric park brake apply state 362 by executing a state change 373.

In the driver control state 354, a state transition 374 to the electric park brake release state 363 can be performed. The braking system controller 122 attempts to execute the state transition 374 when all of a group of state change transition criteria are satisfied. In particular, the state transition 374 is executed when the electronic parking brake is currently applied (EPB_APPLIED==1), the target state for the braking system 226 is the manual drive substate 355 (MANUAL_DRIVE), and a request for release of the electric park brake is active (EPB_RELEASE_REQUESTED==1). In response to satisfaction of all of these conditions, the braking system controller 122 executes the state transition 374. In the electric park brake release state 363, the braking system controller 122 determines whether release of the electric park brake was successful and sets an appropriate state transition variable value corresponding to successful release of the electric park brake (EPB_APPLIED==0) or failure to release the electric park brake (EPB_FAILED==1). In response to determining that the state transition variable has been set, the braking system controller 122 returns to the driver control state 354 from the electric park brake release state 363 by executing a state change 375.

In the external control state 357, the braking system 226 inspects the PRIMARY_READY state transition variable and the SECONDARY_READY state transition variable. If the primary brake control module 230 is available (PRIMARY_READY==1), the robotic control substate 358 is entered from a substate transition 376. If the primary brake control module 230 is not available and the secondary brake control module 232 is available (PRIMARY_READY==0 AND SECONDARY_READY==1), the robotic degraded control substate 359 is entered from a substate transition 377.

In the external control state 357, a state transition 378 to the electric park brake apply state 362 can be performed. The braking system controller 122 attempts to execute the state transition 378 when the electronic parking brake is not currently applied (EPB_APPLIED==0) in response to determining that application of the parking brake has been requested (EPB_APPLY_REQUESTED==1). In the electric park brake apply state 362, the braking system controller 122 determines whether application of the electric park brake was successful and sets an appropriate state transition variable value corresponding to successful application of the electric park brake (EPB_APPLIED==1) or failure to apply the electric park brake (EPB_FAILED==1). In response to determining that the state transition variable has been set, the braking system controller 122 returns to the external control state 357 from the electric park brake apply state 362 by executing a state change 379.

In the external control state 357, a state transition 380 to the electric park brake release state 363 can be performed. The braking system controller 122 attempts to execute the state transition 380 when the electronic parking brake is currently applied (EPB_APPLIED==1) in response to determining that a request for release of the electric park brake is active (EPB_RELEASE_REQUESTED==1). In the electric park brake release state 363, the braking system controller 122 determines whether release of the electric park brake was successful and sets an appropriate state transition variable value corresponding to successful release of the electric park brake (EPB_APPLIED==0) or failure to release the electric park brake (EPB_FAILED==1). In response to determining that the state transition variable has been set, the braking system controller 122 returns to the external control state 357 from the electric park brake release state 363 by executing a state change 381.

In the external control state 357, a state transition 382 to the driver control state 354 can be performed. The braking system controller 122 attempts to execute the state transition 382 when any of a group of state transition criteria are satisfied. In this example, the group of state transition criteria include determining that the current target state is the manual drive substate 355 (MANUAL_DRIVE) or a stopped state such as the parking state (PARK_ACCY), in response to determining that the primary brake control module 230 and the secondary brake control module 232 are not available to accept external commands (ROBOTIC_READY==0), in response to determining that the master cylinder pressure is greater than or equal to a threshold (Master_Cylinder_Pressure>=MASTER_CYLINDER_PRESSURE_THR), in response to determining that the brake pedal travel is greater than or equal to a threshold (Brake_Pedal_Travel>=BRAKE_PEDAL_TRAVEL_THR), or in response to determining that the brake booster is not operational (BOOSTER_READY==0). If any of the conditions are satisfied, the braking system controller 122 executes the state transition 382, exits the external control state 357, and enters the driver control state 354.

In the external control state 357, a state transition 383 to the emergency stop state 361 can be performed. The braking system controller 122 attempts to execute the state transition 383 when the emergency stop state has been set as the current target state and all of the criteria from a group of additional state transition criteria are satisfied. In this example, the additional state transition criteria include determining that the brake booster is operational (BOOSTER_READY==1), and determining that the brake pedal travel is less than or equal to a threshold (Brake_Pedal_Travel<=BRAKE_PEDAL_TRAVEL_THR). If all of these conditions are satisfied, the braking system controller 122 executes the state transition 383, exits the external control state 357, and enters the emergency stop state 361. In the emergency stop state 361, the braking system 226 executes the emergency braking maneuver and sets state transition variables. The braking system controller 122 then executes a state transition 384 to the driver control state 354 in response to determining that all of a set of state transition criteria are satisfied. In this example, the state transition 384 is executed when the emergency braking maneuver is completed (E_STOP_COMPLETED==1), the brake booster is able to accept external commands (BOOSTER_CONTROL==1), and the brake booster pressure is adequate to hold the vehicle 100 at a stop (Booster_Pressure>=BOOSTER_PRESSURE_HOLD). If all of the conditions are satisfied, the braking system controller 122 executes the state transition 384, exits the emergency stop state 361, and enters the driver control state 354.

In the remote robotic ready state 360, a state transition 385 to the driver control state 354 can be performed. The braking system controller 122 attempts to execute the state transition 385 when any of a group of state transition criteria are satisfied. In this example, the group of state transition criteria include determining that the current target state is the manual drive substate 355 (MANUAL_DRIVE) or a stopped state such as the parking state (PARK_ACCY), in response to determining that the criteria for entering the remote robotic ready state 360 are no longer satisfied (REMOTE_ROBOTIC_READY==0), in response to determining that the master cylinder pressure is greater than or equal to a threshold (Master_Cylinder_Pressure>=MASTER_CYLINDER_PRESSURE_THR), in response to determining that the brake pedal travel is greater than or equal to a threshold (Brake_Pedal_Travel>=BRAKE_PEDAL_TRAVEL_THR), or in response to determining that the brake booster is not able to accept external commands (BOOSTER_CONTROL==0). If any of the conditions are satisfied, the braking system controller 122 executes the state transition 385, exits the remote robotic ready state 360, and enters the driver control state 354.

In the remote robotic ready state 360, a state transition 386 to the external control state 357 can be performed. The braking system controller 122 attempts to execute the state transition 385 when a remote robotic control state (REMOTE_ROBOTIC_CONTROL) is set as the target state for the braking system 226. The braking system controller 122 determines whether to execute the state transition based on a group of state transition criteria. In this example, the braking system controller 122 inspects state transition variables to confirm that the primary brake control module 230 and the secondary brake control module 232 are available to accept external commands (ROBOTIC_READY==1), the primary brake control module 230 is operational (PRIMARY_READY==1), and that the remote robotic ready state remains valid such that all criteria for entering the remote robotic ready state 360 remain satisfied (REMOTE_ROBOTIC_READY==1). If all of the conditions are satisfied, the braking system controller 122 executes the state transition 386, exits the remote robotic ready state 360, and enters the external control state 357.

In the remote robotic ready state 360, a state transition 387 to the electric park brake apply state 362 can be performed. The braking system controller 122 attempts to execute the state transition 387 when the electric park brake is not currently applied (EPB_APPLIED==0) while in the remote robotic ready state 360. In the electric park brake apply state 362, the braking system controller 122 determines whether application of the electric park brake was successful and sets an appropriate state transition variable value corresponding to successful application of the electric park brake (EPB_APPLIED==1) or failure to apply the electric park brake (EPB_FAILED==1). In response to determining that the state transition variable has been set, the braking system controller 122 returns to the remote robotic ready state from the electric park brake apply state 362 by executing a state change 388.

Figure 4:
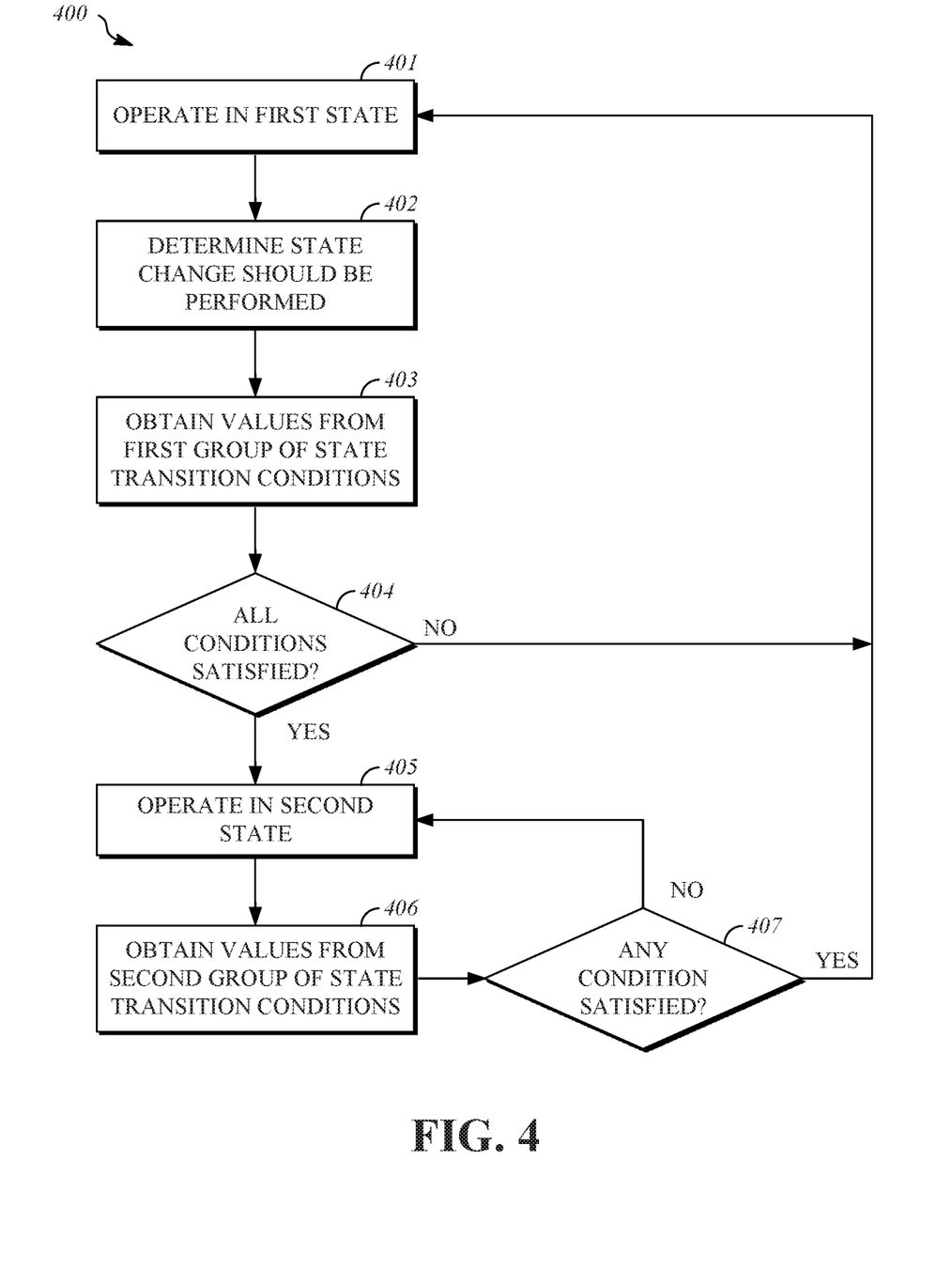
FIG. 4 is a flowchart showing a braking system control state transition process according to a first example.

FIG. 4 is a flowchart showing a braking system control state transition process 400 according to a first example. The process 400 may be implemented using the braking system 226, and may be implemented in part by software executed by some or all of the components of the vehicle 100, such as the vehicle control module 114 and the braking system controller 122.

In operation 401, the braking system 226 of the vehicle 100 is operated in a first control state. The first control state can be a manual control state in which primary control of the braking system 226 is directed by a human operator. Manual control can be performed using an input device that controls a magnitude of a braking force applied by the braking system 226. As an example, the input device can be the brake pedal 238. In the first control state, operation of the input device does not cause a state change from the first state to a different state.

In operation 402, the braking system 226 determines that a state change from the first state to a second state should be performed. As one example, the braking system 226 determines that the state change from the first state to the second state should be performed upon receiving a request for a state change from the vehicle control module 114. The second control state can be a non-manual control state in which no human operator within the vehicle has primary responsibility for operation of the vehicle brakes, such as the external control state 357.

In operation 403, the braking system 226 obtains information describing a first group of state transition conditions that correspond to transition from the first control state to the second control state and values corresponding to each of the state transition conditions. The state transition conditions can be, as examples, variables having values that describe current operating states or characteristics of the vehicle 100 or variables that express a measurement that is related to operation of the vehicle 100 or a system of the vehicle 100.

In operation 404, the braking system 226 determines whether all conditions from the first group of state transition conditions are satisfied. If all conditions from the first group of state transition conditions are satisfied, the process proceeds to operation 405. Otherwise, the process returns to operation 401 and the vehicle 100 continues to operate in the first control state.

In operation 405, the braking system 226 operates the vehicle 100 in the second control state. In operation 406, the braking system 226 obtains information describing a second group of state transition conditions that correspond to transition from the second control state to the first control state. At operation 407, the process returns to operation 405 if none of the conditions from the second group of state transition conditions are satisfied, and the process returns to operation 401 by transitioning the vehicle 100 back to the first control state if any of the conditions from the second group of state transition conditions are satisfied.

Figure 5:
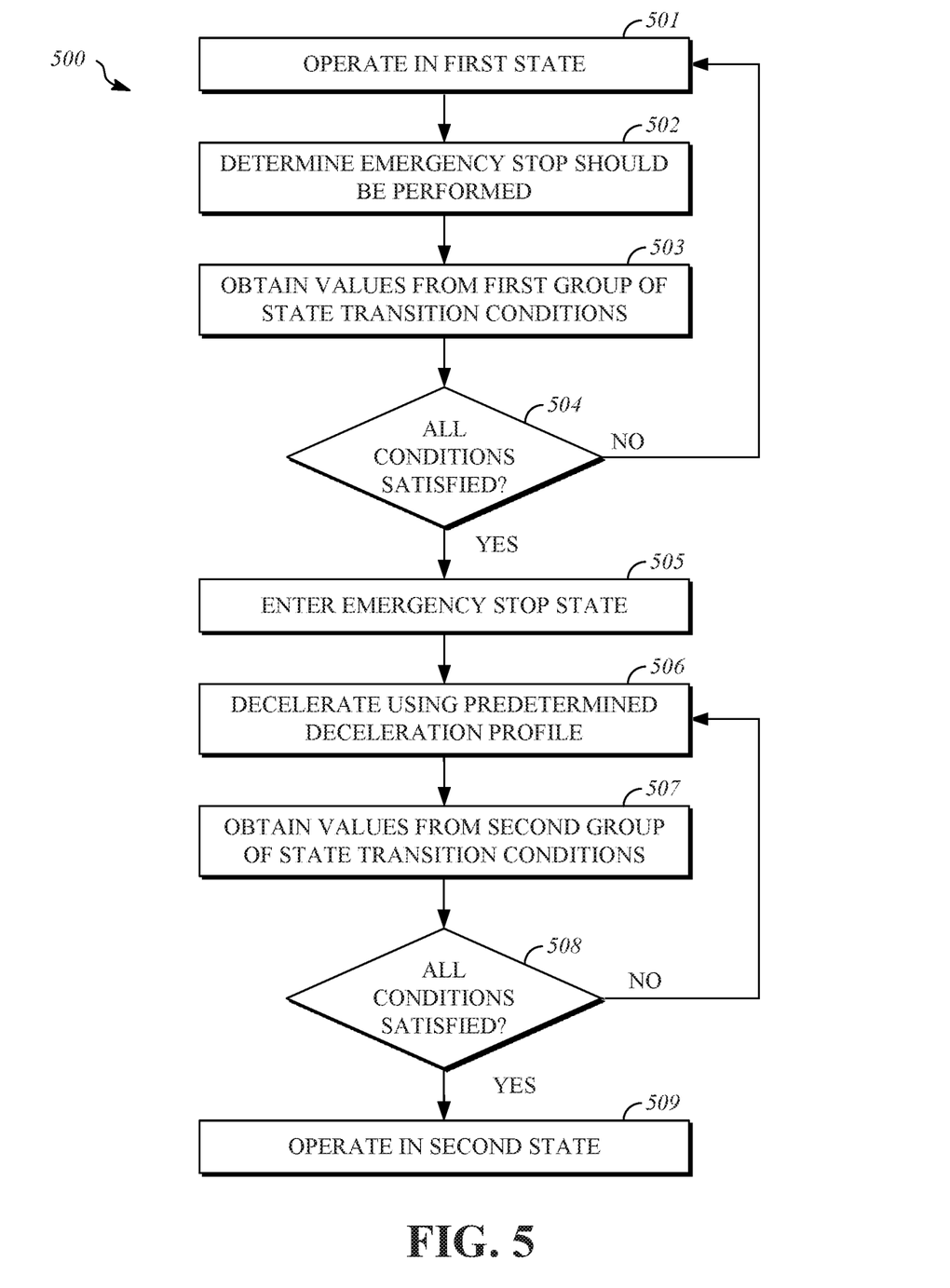
FIG. 5 is a flowchart showing a braking system control state transition process according to a second example.

FIG. 5 is a flowchart showing a braking system control state transition process 500 according to a second example. The process 500 may be implemented using the braking system 226, and may be implemented in part by software executed by some or all of the components of the vehicle 100, such as the vehicle control module 114 and the braking system controller 122.

In operation 501, the braking system 226 of the vehicle 100 is operated in a first control state. The first control state can be a non-manual, robotic control state in which primary control of the braking system 226 is not directed by a human operator that is located within the vehicle 100.

In operation 502, the braking system 226 determines that an emergency stop maneuver should be performed by a state change from the first state to an emergency stop state. Determining that the emergency stop maneuver is to be performed can be in response to receiving, at the braking system 226, an external request for the emergency stop maneuver. Determining that the emergency stop maneuver is to be performed can be in response to determining that a vehicle operating characteristic is outside of an acceptable range. Determining that the emergency stop maneuver is to be performed can be in response to determining that communications via the data communication network 228 have been disrupted.

In operation 503, the braking system 226 obtains information describing a first group of state transition conditions that correspond to transition from the first control state to the emergency stop state and associated values for the state transition conditions. The state transition conditions can be, as examples, variables having values that describe current operating states or characteristics of the vehicle 100 or variables that express a measurement that is related to operation of the vehicle 100 or a system of the vehicle 100.

In operation 504, the braking system 226 determines whether all conditions from the first group of state transition conditions are satisfied. If all conditions from the first group of state transition conditions are satisfied, the process proceeds to operation 505 where the braking system 226 exits the first control state and enters the emergency stop state, otherwise, the process returns to operation 501 and the vehicle 100 continues to operate in the first control state.

In operation 505, the braking system 226 enters the emergency stop state and operates the vehicle 100 in accordance with procedures associated with the emergency stop state. In operation 506, the braking system 226 decelerates the vehicle according to a predetermined deceleration profile.

In operation 507, the braking system 226 obtains information describing a second group of state transition conditions that correspond to transition from the emergency stop state to a second control state and associated values for the state transition conditions. At operation 508, the process returns to operation 506 and the braking system 226 remains in the emergency stop state if all of the conditions from the second group of state transition conditions are not satisfied. If, at operation 508, all of the conditions from the second group of state transition conditions are satisfied, the process proceeds to operation 509 by exiting the emergency stop state and entering the second control state. As an example, the second control state can be a manual control state.

What is claimed is:

1. A braking system for a vehicle, comprising:
a vehicle control module that has a manual control state and a non-manual control state;
a braking system controller;
braking actuators that are operable to decelerate the vehicle;
a primary brake control module that is connected to the braking actuators and operable to cause operation of the braking actuators; and
a secondary brake control module that is connected to the braking actuators and operable to cause operation of the braking actuators,
wherein the braking system controller transitions operation from a normal operation mode, in which the braking actuators are operated by the primary brake control module, to a degraded operation mode, in which the braking actuators are operated by the secondary brake control module, in response to determining that the primary brake control module is not available for use,
wherein the vehicle control module is operable to request transition between the manual control state and the non-manual control state, and
wherein the braking system controller is operable to permit transition from the manual control state to the non-manual control state during the normal operation mode, and the braking system controller is operable to prevent transition from the manual control state to the non-manual control state during the degraded operation mode.

2. The braking system of claim 1, wherein primary control of the braking actuators is directed by a human operator in the manual control state.

3. The braking system of claim 1, wherein no human operator within the vehicle has primary responsibility for operation of the braking actuators in the non-manual control state.

4. The braking system of claim 1, wherein the braking system controller transitions from the normal operation mode to the degraded operation mode in response to determining that one or more conditions from a first group of conditions are satisfied.

5. The braking system of claim 4, wherein the braking system controller transitions from the degraded operation mode to the normal operation mode in response to determining that all of the conditions from the first group of conditions are satisfied.

6. The braking system of claim 1, wherein the braking system controller transitions from the normal operation mode to the degraded operation mode in response to receiving a signal, from the primary brake control module, indicating that the primary brake control module is not operational.

7. The braking system of claim 1, wherein the braking actuators are hydraulic braking actuators that are hydraulically connected to the primary brake control module and the secondary brake control module.

8. The braking system of claim 1, wherein the braking actuators are electrical braking actuators that are electrically connected to the primary brake control module and the secondary brake control module.

9. A braking system for a vehicle, comprising:
a data communication network;
a braking system controller that is operable to transmit braking commands using the data communication network in a non-manual control state;
braking actuators that are operable to decelerate the vehicle; and
a brake control module that receives the braking commands from the braking system controller over the data communication network, is connected to the braking actuators, and is operable to interpret the braking commands and control operation of the braking actuators based on the braking commands, wherein the brake control module is operable to:
determine that communications with the braking system controller over the data communications network have been disrupted while in the non-manual control state,
enter an emergency stop state in response to the determination that communications with the braking system controller have been disrupted, and
control operation of the braking actuators to decelerate the vehicle while in the emergency stop state.

10. The braking system of claim 9, wherein no human operator within the vehicle has primary responsibility for operation of the braking actuators in the non-manual control state.

11. The braking system of claim 9, wherein the brake control module is operable to remain in the emergency stop state until the vehicle is at a complete stop.

12. The braking system of claim 11, wherein the brake control module is operable to transition to a manual control state after the vehicle is at the complete stop.

13. The braking system of claim 12, wherein primary control of the braking actuators is directed by a human operator within the vehicle in the manual control state.

14. The braking system of claim 9, wherein brake control module uses a predefined acceleration profile to decelerate the vehicle while in the emergency stop state.

15. The braking system of claim 9, wherein brake control module uses a predefined braking pressure to decelerate the vehicle while in the emergency stop state.

16. A braking system for a vehicle, comprising:
a braking system controller that is able to operate in a manual control state and a non-manual control state, wherein the braking system controller is operable to output braking commands in the non-manual control state;
braking actuators that are operable to decelerate the vehicle; and a brake control module controls operation of the braking actuators using control inputs from a human driver in the manual control state and controls operation of the braking actuators using the braking commands from the braking system controller in the non-manual control state, wherein the braking system controller is operable to determine values for a first state transition variable and a second state transition variable, evaluate a first state transition condition using the first state transition variable, evaluate a second state transition condition using the second state transition variable, allow transition from the manual control state to the non-manual control state if the first state transition condition and the second state transition condition are satisfied, and prevent transition from the manual control state to the non-manual control state if either of the first state transition condition or the second state transition condition are not satisfied.

17. The braking system of claim 16, wherein the first state transition variable indicates whether the first state transition condition is true or false and the second state transition variable indicates whether the second state transition condition is true or false.

18. The braking system of claim 17, wherein the first state transition variable and the second state transition variable are each represented by a bit flag.

19. The braking system of claim 17, wherein the first state transition variable and the second state transition variable are set according to comparison of a measured value to a threshold value.

20. The braking system of claim 16, wherein no human operator within the vehicle has primary responsibility for operation of the braking actuators in the non-manual control state.

21. The braking system of claim 16, wherein primary control of the braking actuators is directed by a human operator in the manual control state.

* * * * *